United States Patent
Dhawan et al.

(10) Patent No.: US 10,762,288 B2
(45) Date of Patent: Sep. 1, 2020

(54) ADAPTIVE MODIFICATION OF CONTENT PRESENTED IN ELECTRONIC FORMS

(71) Applicant: Adobe Inc., San Jose, CA (US)

(72) Inventors: Anmol Dhawan, Ghaziabad (IN); Ashish Duggal, Delhi (IN); Vikas Yadav, Noida (IN); Sachin Soni, New Delhi (IN)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 16/240,210

(22) Filed: Jan. 4, 2019

(65) Prior Publication Data

US 2019/0138586 A1 May 9, 2019

Related U.S. Application Data

(63) Continuation of application No. 14/531,560, filed on Nov. 3, 2014, now Pat. No. 10,191,895.

(51) Int. Cl.
*G06F 17/00* (2019.01)
*G06F 40/174* (2020.01)
*G06F 16/35* (2019.01)
*G06F 40/197* (2020.01)

(52) U.S. Cl.
CPC ........... *G06F 40/174* (2020.01); *G06F 16/35* (2019.01); *G06F 40/197* (2020.01)

(58) Field of Classification Search
None
See application file for complete search history.

(56) References Cited

U.S. PATENT DOCUMENTS

| 8,977,678 | B2 * | 3/2015 | Jarville | G06Q 30/0201 |
| | | | | 709/201 |
| 2006/0155513 | A1 | 7/2006 | Mizrahi | |
| 2009/0306967 | A1 | 12/2009 | Nicolov | |
| 2011/0076663 | A1 * | 3/2011 | Krallman | G09B 7/00 |
| | | | | 434/362 |
| 2012/0096344 | A1 * | 4/2012 | Ho | G06F 17/211 |
| | | | | 715/249 |

(Continued)

OTHER PUBLICATIONS

Notice of Allowance from related U.S. Appl. No. 14/531,560 dated Sep. 20, 2018, 16 pages.

*Primary Examiner* — Mustafa A Amin
(74) *Attorney, Agent, or Firm* — Kilpatrick Townsend & Stockton LLP

(57) ABSTRACT

Systems and methods are provided for intelligently adapting content presented in electronic forms. In some embodiments, a processor provides access to multiple instances of a first version of an electronic form by multiple clients based on determining that insufficient data exists in a data source for a category of information. The first version of the form can include content for soliciting data associated with the category of information. The processor can receive responsive electronic communications in response to providing access to the first version of the form. The processor can provide access to multiple instances of a second version of the electronic form by multiple clients based on determining from the received responses whether sufficient data exists for the category of information. The second version of the electronic form can omit or replace the content for soliciting data associated with the category of information.

20 Claims, 9 Drawing Sheets

(56) References Cited

U.S. PATENT DOCUMENTS

| | | | |
|---|---|---|---|
| 2012/0130934 A1* | 5/2012 | Brillhart | G06Q 30/0203 |
| | | | 706/46 |
| 2012/0226743 A1 | 9/2012 | Smargon | |
| 2012/0271884 A1 | 10/2012 | Holmes | |
| 2012/0277887 A1 | 11/2012 | Reese | |
| 2014/0046729 A1 | 2/2014 | Meyer | |
| 2014/0229237 A1 | 8/2014 | Tryfon | |

* cited by examiner

900

```
import nltk
import urllib

#Normalization Starts
tokens = nltk.word_tokenize(comment_text)
words = [w.lower() for w in tokens]

porter = nltk.PorterStemmer()
lancaster = nltk.LancasterStemmer()

stemedwords_first_pass = [porter.stem(t) for t in words]
stemedwords_final_pass = [lancaster.stem(t) for t in stemedwords_first_pass]

wnl = nltk.WordNetLemmatizer()
completely_normalized_words = [wnl.lemmatize(t) for t in stemedwords_final_pass]

#Normalization Ends, Part of Speech Tagging starts
pos_tagged_words = nltk.pos_tag(completely_normalized_words)

#Extract Nouns & Proper Nouns in order of their frequency
myDict = dict()
for key, val in sorted(pos_tagged_words):
    if((val == 'NNP' or val == 'NN') and len(key) > 3):
        if(myDict.has_key(key) == False):
            myDict[key] = 1
        else:
            myDict[key] = (myDict.get(key) + 1)

for word in sorted(myDict, key=myDict.get, reverse=True):
    if(myDict.get(word) > 0):
        print word + ":", myDict.get(word) #Print nouns,proper nouns whose occurrence is at least once
```

FIG. 9

ADAPTIVE MODIFICATION OF CONTENT PRESENTED IN ELECTRONIC FORMS

CROSS-REFERENCE TO RELATED APPLICATIONS

This application is a continuation application of application Ser. No. 14/531,560, filed Nov. 3, 2014, now allowed, which is incorporated herein by reference in its entirety.

TECHNICAL FIELD

This disclosure relates generally to computer-implemented methods and systems and more particularly relates to intelligently adapting content presented in electronic forms.

BACKGROUND

Electronic forms, such as customer surveys, can be used by vendors and other businesses to obtain feedback and other data from customers and other users. Different types of form documents can be used to obtain different categories of information from users. For example, different versions of a form can solicit different types of user responses by adding or removing fields or sections between versions.

Current solutions for providing electronic forms may present disadvantages. In one example, including larger numbers of fields in a form may discourage users from completing all fields in the form. If completion of the form is voluntary, including larger numbers of fields in the form may discourage users from filling out the form at all. In another example, narrative portions of a form in which users can type sentences or paragraphs may require more time to complete. Thus, users may be disinclined to respond to questions requiring narrative content. Transmitting electronic forms over a data network without receiving responses can also result in inefficient use of network bandwidth or other computing resources.

It is desirable to provide adaptive modifications to electronic form content in which narrative portions of a form are more likely to be completed.

SUMMARY

According to certain embodiments, systems and methods are provided for intelligently adapting the content presented in electronic forms. In accordance with some embodiments, a server or other processing device can perform a method for adaptively modifying content in electronic forms. The server or other processing device can determine that insufficient data exists in a data source for a category of information (e.g., responses to a specific question on an electronic form). The server or other processing device can provide access to multiple instances of a first version of an electronic form by multiple clients (e.g., by transmitting the form to multiple client devices or transmitting a link to the form over a data network to the client devices). The first version of the electronic form can include content for soliciting data associated with the category of information. The server or other processing device can receive responsive electronic communications (e.g., messages include data entered into a displayed instance of the form) in response to providing access to the first version of the electronic form. The server or other processing device can determine, based on the received responsive electronic communications, whether sufficient data exists for the category of information. The server or other processing device can provide access to multiple instances of a second version of the electronic form by multiple clients based on determining whether sufficient data exists for the category of information. The second version of the electronic form can omit or replace the content for soliciting data associated with the category of information. For example, the second version of the electronic form may omit questions for which a consensus has been reached or provide more specific questions in place of questions for which a consensus has been reached.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings, where:

FIG. 9 is a diagram depicting an example of a script for performing a natural language processing algorithm using a string or other narrative content according to certain exemplary embodiments;

DETAILED DESCRIPTION

Figures 1, 2, 3:
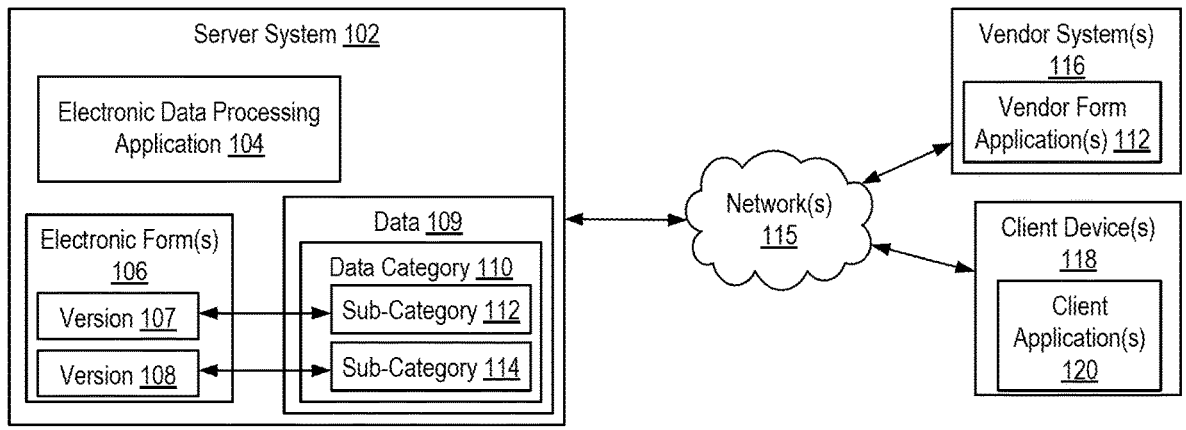
FIG. 1 is a block diagram depicting an example of a system that includes a server that executes an electronic data processing application for adaptively presenting content from electronic forms provided by vendors systems to client devices according to certain exemplary embodiments.
FIG. 2 is a diagram depicting an example of a version of an electronic form to which the electronic data processing application provides access according to certain exemplary embodiments.
FIG. 3 is a diagram depicting an example of an interface that is provided by the electronic data processing application for a vendor system to select options for adaptively modifying content in an electronic form according to certain exemplary embodiments.

Computer-implemented systems and methods are disclosed for intelligently adapting the content presented in electronic forms. The intelligent adaptation of content presented in electronic forms can be used to facilitate the display of and interaction with electronic forms on mobile devices, to incentivize completion of forms requesting narrative content or other non-standardized data (e.g., a text field for responding to a question), and/or to generate effective business insights.

The following non-limiting example is provided to help introduce the general subject matter of certain embodiments. An electronic data processing application executed by a server or other computing system can adaptively reduce or modify the amount or type of content presented in an electronic form. For example, a first version of an online customer service form can include one or more fields soliciting information in one or more categories of data (e.g., a set of fields soliciting feedback regarding the cleanliness of a store, feedback regarding the friendliness of store employees, feedback regarding the knowledge level of store employees, etc.). Multiple instances of the first version of the form can be provided to users over a first period of time. For example, the first version of the form may be presented in web browsers for different users, may be e-mailed to different users, etc.

The electronic data processing application can analyze data obtained via the presented instances of the first version of the form and thereby determine whether a consensus has been reached with respect to one or more categories of information. A consensus can include, for example, a certain threshold of records associated with a given category having a value from a specified subset of values that is smaller than the set of available values. For example, if a form asks a user to rate the knowledge level of store employees on a scale of 1-5 (i.e., the set of available values), the electronic data processing application can determine that a consensus exists regarding the knowledge level of store employees if 90% of responses (e.g., the threshold number of responses) provide a rank of 1 or 2 (i.e., the specified subset of values) for the employees' knowledge level.

The electronic data processing application can execute one or more algorithms to analyze the data obtained via the presented instances of the first version of the form. For example, the electronic data processing application can identify responsive data received during a specified period of time. In some aspects, the responsive data can include values from discrete data sets, such as rankings or other numeric values. In additional or alternative aspects, the responsive data can include narrative data (e.g., one or more text strings entered into a field). For aspects involving narrative data, the electronic data processing application can execute one or more algorithms for determining, identifying, or otherwise obtaining sentiments from the narrative data that can be used for determining a consensus. In some aspects, the electronic data processing application can analyze the responsive data by determining if the number of responses received with a given time period and having given data values (e.g., a given ranking or set of rankings, a given sentiment or group of sentiments, etc.) exceeds a threshold number of responses. The electronic data processing application can, for example, determine that a consensus exists based on the threshold number of responses having the appropriate data being received within a given time period.

Based on the analysis, the electronic data processing application can generate multiple instances of a second version of the form in which the fields associated with the specified category of information are omitted or replaced. For example, over a second period of time, a question associated with the knowledge level of store employees can be omitted in at least some of instances of the form that are provided to users or can be replaced with one or more questions soliciting more specific feedback regarding the knowledge level of store employees (e.g., questions about employees' knowledge of sales processes or product features).

The fields associated with the specified category of information can be omitted or replaced based on determining that a consensus exists for these fields. A consensus existing for these fields may indicate, for example, that a smaller amount of value may be obtained by repeating the same question for the category of information in subsequent versions of the form (at least for a specified period of time following the consensus). Omitting or reducing the frequency of the fields for which a consensus exists can reduce the size of the form as presented on a screen, which may induce subsequent users to complete the form at a higher rate. Thus, omitting the field for which a consensus exists may result in higher completion rates, which may be more valuable than obtaining additional data for a category of information for which a consensus exists. Additionally or alternatively, replacing the fields for which a consensus exists with fields soliciting more specific data than the replaced field can be used to obtain more detailed insights. Thus, replacing the field for which a consensus exists may result in obtaining more valuable data for a given category of information than may be obtained by leaving a question on a form unchanged once the consensus has been reached.

In accordance with some embodiments, a server or other processing device can perform a method for adaptively modifying content in electronic forms. The server or other processing device can determine that insufficient data exists in a data source for a category of information. For example, a server that manages electronic forms can determine that an insufficient number of responses to the forms have been received, that an insufficient amount of data from the responses has been obtained for determining whether a consensus exists with respect to one or more categories of information, that an insufficient number of the received responses includes data responsive to certain types of questions associated with a category of information (e.g., narrative content or other non-standardized data), and the like. The server or other processing device can provide access to multiple instances of a first version of an electronic form by multiple clients based on determining that insufficient data exists for the category of information. The first version of the electronic form can include content for soliciting data associated with the category of information for which insufficient data exists. Providing access to the instances of the electronic form can include, for example, transmitting the electronic form in a web page to a client device executing a web browser application, transmitting the electronic form in an e-mail message to a client device executing an e-mail application, transmitting a hyperlink or other network identifier to a client device that can be used to access an instance of the form, etc.

The server or other processing device can receive responsive electronic communications (e.g., a collection of data entered via a displayed instance of the form) in response to providing access to the first version of the electronic form. The server or other processing device can determine whether sufficient data exists for the category of information based on the received responsive electronic communications. The server or other processing device can provide access to multiple instances of a second version of the electronic form by multiple clients based on determining whether sufficient data exists for the category of information. The second version of the electronic form can omit or replace the content for soliciting data associated with the category of information. For example, the second version of the electronic form can omit questions for which a consensus has been reached or provide more specific questions in place of questions for which a consensus has been reached.

Any suitable process can be used to determine that a consensus has been reached for a given category of information (e.g., information obtained using specific fields associated with specific questions in an electronic form). In some embodiments, a consensus can be determined from data received via fields that are defined or otherwise configured for receiving standardized data. For example, a server or other processing device can determine that a consensus exists if a threshold number of responses provides a rank of "1" or "2" from a range of "1-10." In additional or alternative embodiments, a consensus can be determined from data received via fields configured for receiving non-standardized data, such as narrative content. In one example, a server or other processing device can determine that a consensus exists if a threshold number of responses include narrative content in which certain keywords (e.g., "crowding," "disorganized," etc.) are used. In another example, a server or other processing device can determine that a consensus exists if a threshold number of responses include narrative content having a certain sentiment. For instance, a processing device can execute a sentiment analysis algorithm to classify narrative content in a response as "positive" or "negative." A threshold number of responses including positive sentiments or negative sentiments can correspond to a consensus being reached for the category of information associated with the narrative content.

In some embodiments, a frequency with which certain content is omitted or replaced can correspond to an amount of data used to obtain a consensus. Content used to obtain data can be omitted at a higher frequency if a consensus is obtained from a larger amount of the obtained data, and content can be omitted at a lower frequency if a consensus is obtained from a smaller amount of the obtained data. For example, if a consensus has been reached based on 95% of responses providing a given answer to a question (or an answer from a given set of answers), the frequency used for omitting content can be 70%. If a consensus has been reached based on 80% of responses providing a given answer to a question (or an answer from a given set of answers), the frequency used for omitting content can be 40%. An example of a default frequency f that can be used for optimizing the display of content in electronic forms is $f=(25+(100-p) \times 2.5)/100$, where p is a threshold percentage of responses required for obtaining a consensus.

In some embodiments, the electronic data processing application can generate, select, or otherwise obtain alternative versions of an electronic form based on both the analysis of the previously received data and a determination that the alternative version of the form will be presented on a mobile device or another computing device having a small screen size. For example, certain form content that is used for obtaining data may be omitted when presenting a form on a smart phone after reaching a consensus from the data that was obtained using the form content.

In some embodiments, an alternative version of a form can be selected, generated, or otherwise obtained based on identifying a sub-category of information and determining that the alternative version of the electronic form has form content for soliciting data associated with the sub-category of information. For example, the content in the first version of the electronic form can include a ranking for the category and at least one field that is restricted to receiving standardized data, such as a discrete value from a specified set of values indicative of respective rankings. Determining whether sufficient data exists for the category of information can involve determining that a threshold number of the responsive communications includes a subset of values from the set of values, where the subset of values is indicative of an overall ranking of the category. The second version of the electronic form can be selected based on determining that the second version of the form includes additional content in the second version that solicits information for explaining the overall ranking of the category (e.g., by soliciting information with respect to one or more sub-categories of a broader category).

In additional or alternative embodiments, the electronic data processing application can analyze data received via portions of a form that solicit standardized data and adapt the presentation of electronic form content related to narrative content or other non-standardized data based on the analysis. Examples of standardized data include data that is limited to a subset of values from the range of available values for a data type, Boolean values, and the like. Non-standardized data can include data in which the content for a given data type is not limited to particular values of the data type (e.g., string values that are not limited to specific letters or words, integer values that are not limited to specific ranges of values, etc.). For example, a first version of a form can include a first set of fields requesting standardized data (e.g., a series of radio buttons, fields requesting ratings on a scale of "1 to 10", etc.) and a second set of fields requesting non-standardized data (e.g., fields requesting that a user enter text strings that describe an experience, such as "Tell us about your experience at the store"). The electronic data processing application can receive data via multiple instances of the first version of the form over a first period of time (e.g., customer feedback received using the radio buttons or fields requesting ratings). The electronic data processing application can analyze the data received using the standardized data fields to generate supplemental content associated with the fields associated with non-standardized data. The electronic data processing application can transmit multiple instances of a second version of the electronic form that is generated using the supplemental content.

In additional or alternative embodiments, narrative content or other non-standardized data can be used to determine whether a consensus exists. The content in the first version of the electronic form can include one or more questions soliciting narrative content. The electronic data processing application can analyze received responses to identify keywords and/or sentiments associated with the narrative content included in the responses. For instance, if 90% of the responses (i.e., the threshold number) includes the keywords "crowd" or "disorganized" and/or includes narrative content that can be characterized as having a negative sentiment, the electronic data processing application can determine that these responses collectively indicate to a consensus of "unsatisfied" for a data category related to a shopping experience.

In some embodiments, the supplemental content can include specific questions to be presented with the fields associated with non-standardized data (e.g., "Was the store messy, organized, clean, well-lit?"). Generating the second version of the form can involve presenting the non-standardized data entry fields with the specific questions (e.g., "Tell us about your experience at the store—Was the store messy, organized, clean, well-lit?"). In other embodiments, the supplemental content can include additional fields soliciting standardized data related to the type of information that is solicited using the non-standardized data fields (e.g., a field for rating the organization of a store on scale from 1-10, a field for rating the cleanliness of a store on scale from 1-10). Generating the second version of the form can involve omitting the non-standardized data fields (e.g., "Tell us about your experience at the store") and replacing the non-standardized data fields with the additional fields soliciting standardized data (e.g., "Please rate the organization of the store on scale from 1-10," "Please rate the cleanliness of the store on scale from 1-10," etc.).

In some embodiments, adaptively modifying content presented in electronic forms can provide more efficient use of network resources involved in the generation and transmission of electronic forms. For example, a certain number and/or quality of responsive electronic communications may be required to determine a consensus or other conclusion from electronic data obtained using electronic forms. If a small number of users responds to a given electronic form or fail to fill out the form completely, a larger number of forms must be transmitted to a larger number of users over a data network in order to determine a consensus or other conclusion from electronic data obtained using electronic forms. Adaptively modifying content presented in electronic forms can increase the number of users providing quality responses to the form. Increasing the number of users providing quality responses to the form can allow fewer forms to be transmitted via a data network and decrease the overall amount of data traffic over a network attributable to transmitting the electronic forms. Thus, in some embodiments, adaptively modifying content presented in electronic forms can provide improved performance in data networks.

The adaptive modification of content presented in electronic forms can implemented in any suitable manner. For example, an electronic data processing application can be implemented by using one or more suitable processing devices to execute suitable program code that includes the electronic data processing application. The one or more suitable processing devices can be included in any number of computing devices, such as (but not limited to) a dedicated server system, a group of servers configured for cloud-based computing, grid-based computing, or other distributed computing, etc. In some aspects, the program code that includes the electronic data processing application can be a stand-alone application executed by a processing device. In other aspects, the program code that includes the electronic data processing application can be incorporated into another application that provides additional functionality. In other aspects, the program code that includes the electronic data processing application can be a plug-in that is installed in or accessible to another application that provides additional functionality.

Referring now to the drawings, FIG. 1 is a block diagram depicting an example of a system that includes a server system 102 that executes an electronic data processing application 104 for adaptively presenting content from electronic forms provided by one or more vendors systems 110 to one or more client devices 114.

The server system 102 can communicate with one or more vendors systems 110 and one or more client devices 114 via one or more of signals communicated via one or more data networks 115. The server system 102 can include one or more processing devices. The server system 102 can include or have access to one or more non-transitory computer-readable media on which program code and electronic data are stored. The electronic data processing application 104, one or more electronic forms, and data 109 can be stored on one or more non-transitory computer-readable media that are included in the server system 102 (as depicted in FIG. 1) or that are otherwise accessible to the server system 102. In some embodiments, the server system 102 can be a single server. In other embodiments, the server system 102 can include multiple computing systems that are configured for grid-based computing or cloud computing.

An electronic form 106 can be an electronic document having one or more fields that are defined or otherwise configured to receive input via a suitable interface. An electronic form 106 can be used to obtain data 109 that is stored on a non-transitory computer-readable medium included in or accessible to the server system 102. An electronic form 106 can be used to obtain data associated with one or more data categories 110. A non-limiting example of an electronic form is a customer survey. The customer survey can have one or more fields for soliciting data in one or more data categories (e.g., helpfulness of employees, product quality, etc.).

In some embodiments, different versions of a given electronic form 106 may be generated or otherwise used by an electronic data processing application 104. For example, a first version 107 of an electronic form 106 may be used prior to obtaining data in a given sub-category 112 of the data category 110 and a second version 108 of the electronic form 106 may be used after obtaining a threshold amount of data in the sub-category 112 of the data category 110. The second version 108 of the electronic form 106 can be used for obtaining data in an additional sub-category 114. In a non-limiting example, for a category 110 such as "Shopping Experience," a first version 107 of an electronic form 106 may include a question regarding the general knowledge of employees in a store (e.g., "How knowledgeable was the employee?") and a second version 108 of the electronic form 106 may include a more targeted question regarding more specific knowledge of the employees (e.g., "How well was the employee able to answer questions about an extended warranty on each product?"). The electronic data processing application 104 can execute one or more algorithms for adaptively selecting, generating, or otherwise using the first version 107 or the second version 108, as described in detail herein.

A vendor system 116 can include any computing device or group of computing devices that can be used to access the server system 102 and thereby provide input to the electronic data processing application 104 regarding one or more electronic forms 106. In some embodiments, a vendor system 116 can transmit one or more of the electronic forms 106 to the server system 102 (e.g., via e-mail, via an upload interface presented in a web browser executed at a vendor system 116, etc.). In additional or alternative embodiments, a vendor system 116 can remotely access the electronic data processing application 104 and use the electronic data processing application 104 to generate one or more of the electronic forms 106 (e.g., via a design interface or a data entry interface presented in a web browser executed at a vendor system 116).

The vendor system 116 can include one or more processing devices for executing one or more vendor form applications 112. A vendor form application 112 can include program code that can be executed at the vendor system 116 for transmitting, creating, editing, modifying, or otherwise using one or more electronic forms 106. In some embodiments, a vendor form application 112 can be a dedicated application installed on a non-transitory computer-readable medium that is included in or accessible to a vendor system 116. In additional or alternative embodiments, a vendor form application 112 can be a web browser application or other suitable application that is installed on a non-transitory computer-readable medium accessible to a vendor system 116 and that can be used to remotely access one or more features of the electronic data processing application 104.

Although FIG. 1 depicts the vendor system 116 as separate from the server system 102 for illustrative purposes, other implementations are possible. For example, in some embodiments, a server system 102 can be accessed by different vendor systems 116 in different domains (e.g., unrelated vendors having different vendor accounts that are stored on or accessible to the server system 102). In additional or alternative embodiments, a server system 102 and a vendor system 116 can be systems in a common domain (e.g., a dedicated server system 102 used by a vendor to solicit customer feedback on the vendor's website).

A client device 118 can include any computing device that can receive or otherwise access one or more electronic forms that the server system 102 transmits to the client device 108 (e.g., by transmitting an interface for an electronic form 106) or to which the server system 102 otherwise provides access by the client device 108 (e.g., by transmitting a link to an electronic form 106). Non-limiting examples of client devices 118 include smart phones, tablet computers, laptop computers, etc. Each client device 118 can execute one or more client applications 120. A client application 120 can include any application suitable for interacting with electronic forms 106 to which the server system 102 provides access. Non-limiting examples of client applications 120 include web browser applications, e-mail applications, native applications for a given vendor stored on a client device (e.g., a downloadable shopping application for the vender), etc.

Although FIG. 1 depicts a server system 102 that executes the electronic data processing application 104 and stores the electronic form 106 and data 109, other implementations are possible. In some embodiments, one or more operations of the electronic data processing application 104 can be distributed among a server system 102 and a client device 118. For example, a server-based electronic data processing application stored on the server system 102 can be executed to determine whether a given version of a form should be presented. A client-based electronic data processing application executed on a client device 118 can communicate with the server-based electronic data processing application to determine which version of a form to present. The client-based electronic data processing application can download or otherwise obtain the version of a form from another system (e.g., a vendor system 116).

FIG. 2 is a diagram depicting an example of an instance of an electronic form 202 to which the electronic data processing application 104 provides access by one or more of the client devices 118. The electronic form 202 can be, for example, a customer survey including one or more questions.

In some embodiments, as depicted in FIG. 2, the electronic form 202 can be defined or otherwise configured to receive standardized data. Standardized data can include a discrete set of inputs that can be entered into an electronic form. One example of standardized data includes data received via a checkbox, a radio button, a button click, etc. (e.g., wherein the discrete set of inputs includes a "clicked" state and an "un-clicked" state). For instance, in the example of an electronic form 202 depicted in FIG. 2, for each of the questions, only a single data input can be received (e.g., input selecting one of the five possible answers).

In additional or alternative embodiments, an electronic form 202 can be defined or otherwise configured to receive non-standardized data. Non-standardized data can include data that is not explicitly restricted to a specific set of inputs. An example of a field for entering non-standardized data is a text field in which narrative content can be typed (e.g., a text field following the question, "How was your shopping experience?"). In some embodiments, fields that are defined or otherwise configured for receiving non-standardized data can include restrictions unrelated to the content of the non-standardized data (e.g., formatting rules, length restrictions, etc.).

The electronic data processing application 104 can be used by a vendor system 116 to select one or more preferences for adaptively modifying forms that are presented to client devices 118. For example, FIG. 3 is a diagram depicting an example of an interface 302 that is provided by the electronic data processing application 104 for selecting options to adaptively modify content in an electronic form 106. The interface 302 can be used by one or more vendor systems 116 to specify one or more conditions that control whether the electronic data processing application 104 selects a version 107 of an electronic form 106 or a version 108 of the electronic form 106.

For illustrative purposes, FIG. 3 depicts certain examples of different options used by a vendor system 116 for controlling operations by the electronic data processing application 104. However, any interface suitable can be used by a vendor to select conditions under which the electronic data processing application 104 adaptively modifies the content presented in an electronic form 106. Additional options and operations for adaptively modifying content in the presentation of an electronic form are described with respect to FIGS. 4-10 below.

In the example depicted in FIG. 3, a vendor can use the interface 302 to select one or more options related to the display of the fourth question included on the form 202 depicted in FIG. 2. In some embodiments, the vendor can use the interface 302 to instruct the electronic data processing application 104 to reduce the size of the form (106 i.e., present a smaller version of the electronic form 106) when certain conditions are satisfied. For example, the interface 302 can be used to specify that after 100 responses have been received, the electronic data processing application 104 is to determine whether a consensus exists with respect to the fourth question. The interface 302 can be used to specify that a consensus exists if 90% of the received responses includes a selection of either answer "1—Not Satisfied" or answer "2—Mostly Unsatisfied." The interface 302 can also be used to specify that a consensus exists if 90% of the received responses includes a selection of either answer "4—Mostly Satisfied" or answer "5—Very Satisfied."

The interface 302 can also be used to specify a frequency with which the fourth question is to be presented in subsequent presentations of the electronic form 106. For example, a first version of the electronic form 106 may include the fourth question. A second version of the electronic form 106 may omit the fourth question and have a reduced size when presented at a client device 118 as compared to the first version of the electronic form 106. The interface 302 may be used to specify that for subsequent presentations of the electronic form 106 (e.g., transmissions of the electronic form 106 to client devices 118), 25% of the presentations will use the second version of the form that omits the fourth question.

In the example depicted in FIG. 3, a vendor can additionally or alternatively use the interface 302 to select one or more options related to obtaining more specific information than the information solicited by the fourth question included on the form 202. For example, a vendor can use the interface 302 to instruct the electronic data processing application 104 to obtain additional information without reducing the size of the form when certain conditions are satisfied. For instance, the interface 302 can be used to specify that after 100 responses have been received, the electronic data processing application 104 is to determine whether a consensus exists with respect to the fourth question, as described above. The interface 302 can also be used to specify one or more alternative questions that may be presented instead of the fourth question in subsequent presentations of the electronic form 106. For example, a first version of the electronic form 106 may include the fourth question related to a category 110 (e.g., "Store employees were knowledgeable"), and a second version of the electronic form 106 may omit the fourth question and include one or more questions soliciting more specific information related to sub-categories of the category 110 (e.g., "Store employees were knowledgeable about sales process," "Store employees were knowledgeable about product specifications," etc.). The interface 302 may be used to specify that subsequent presentations of the electronic form 106 will use the second version of the electronic form 106 in which the fourth question is replaced with the more specific questions directed to the sub-categories of the category 110.

Figure 4:
FIG. 4 is a flow chart depicting an example of a process for intelligently adapting the content presented in electronic forms according to certain exemplary embodiments.

Any suitable process can be used to intelligently adapt how an electronic form is presented at client devices 118. For example, FIG. 4 is a flow chart depicting an example of a process 400 for intelligently adapting the content presented in electronic forms. For illustrative purposes, the method 400 is described with reference to the implementation depicted in FIG. 1. Other implementations, however, are possible.

The process 400 involves determining that insufficient data exists in a data source for a category of information, as depicted in block 410. For example, the electronic data processing application 104 can be executed by a suitable processing device to access data 109 that is stored in a database or other suitable data structure. The database or other suitable data structure can be stored on a non-transitory computer-readable medium that is included in or accessible to the server system 102. The electronic data processing application 104 can identify one or more data categories 110 to be tracked. For example, one or more data categories 110 can include one or more types of customer feedback specified by a vendor using a vendor system 116. The electronic data processing application 104 can perform one or more operations for determining that the data 109 includes sufficient data for a given data category 110. For example, metadata associated with the data 109 can include one or more rules that may be referenced by the electronic data processing application 104 for determining whether sufficient data exists for a given data category 110.

In some embodiments, determining whether sufficient data exists for the category 110 involves determining whether a number of electronic communications that have been received in response to presenting an electronic form 106 exceeds a threshold number of electronic communications. For example, as described above with respect to FIG. 3, the electronic data processing application 104 can receive input from a vendor system 116 that specifies, selects, or otherwise indicates a threshold number of responsive electronic communications that the electronic data processing application 104 can use for determining whether to adaptively modify content presented in an electronic form. If fewer than the threshold number of responsive electronic communications has been received in response to one or more presentations of an electronic form 106, the electronic data processing application 104 can provide access to the electronic form without adaptively modifying the content presented in the electronic form 106. If the threshold number of responsive electronic communications has been received, the electronic data processing application 104 can adaptively modifying the content presented in the electronic form 106.

In additional or alternative embodiments, determining whether sufficient data exists for the category 110 involves determining whether a threshold number of responses have been received with respect to a specific category of information. For example, the electronic data processing application 104 can determine whether a consensus has been reached for a data category 110 that is associated with one or more questions or other electronic content items in a first version of the electronic form 106.

In some embodiments, standardized data can be used to determine whether a consensus exists. The content in the first version of the electronic form can include one or more questions soliciting a ranking for the category and one or more fields associated with the ranking. The one or more fields can be restricted to receiving a discrete value from a specified set of values indicative of the ranking (e.g., clicking a radio button for one of the questions response options depicted in FIG. 2, entering a whole number from a range of "1-5", typing either a "y" to indicate an affirmative response or an "n" to indicate a negative response, etc.). Determining whether sufficient data exists for the category 110 can involve determining if a threshold number of the responsive communications includes a subset of values from the specified set of values that is indicative of an overall ranking for the category. For instance, in the example depicted in FIG. 2, if 90% the responses (i.e., the threshold number) includes selections of either "very satisfied" or "somewhat satisfied" (i.e., a subset of selections from the five possible selections depicted in FIG. 2), the electronic data processing application 104 can determine that these responses include an overall ranking of "satisfied" for the data category 110 associated with a given question in a given version of the electronic form 106 (i.e., one or more content items in the electronic form for soliciting information related to the category).

In additional or alternative embodiments, narrative content or other non-standardized data can be used to determine whether a consensus exists. The content in the first version of the electronic form can include one or more questions soliciting narrative content. The electronic data processing application 104 can analyze received responses to identify keywords and/or sentiments associated with the narrative content included in the responses. For instance, if 90% of the responses (i.e., the threshold number) includes the keywords "crowd" or "disorganized" and/or includes narrative content that can be characterized as having a negative sentiment, the electronic data processing application 104 can determine that these responses collectively indicate to a consensus of "unsatisfied" for a data category 110 related to a shopping experience.

In additional or alternative embodiments, determining whether sufficient data exists for the category 110 can involve determining whether sufficient data associated with a specified time period exists for the category 110. For example, a specified time period may be stored in a non-transitory computer-readable medium accessible to the server system 102. The electronic data processing application 104 can compare the specified time period (e.g., the week of October 5 to October 11) to a time associated with data stored for a given category 110. The electronic data processing application 104 can exclude any data 109 in the category 110 that is associated with a point in time outside of the specified time period. The electronic data processing application 104 can determine whether the non-excluded data includes sufficient data for the category 110. In some embodiments, the specified time period can be identified based on input received from a vendor system 116. In additional or alternative embodiments, the specified time period can be identified based on a default value used by the electronic data processing application 104.

The process 400 also involves providing access to multiple instances of a first version of an electronic form based on determining that insufficient data exists for the category of information, as depicted in block 420. For example, the electronic data processing application 104 can be executed by a suitable processing device to provide access to the first version of the electronic form 106. In some embodiments, providing access to a version of the electronic form 106 can involve the electronic data processing application 104 generating multiple instances of a version of the form 106. The electronic data processing application 104 can configure the server system 102 to transmit electronic data including the instances of the form version to multiple client devices 118 via a data network 115, such as the Internet. In additional or alternative embodiments, providing access to a version of the electronic form 106 can involve the electronic data processing application 104 generating multiple instances of a data network identifier at which the version of the form can be accessed (e.g., a hyperlink to a website at which the form is hosted). The electronic data processing application 104 can configure the server system 102 to transmit electronic data including the instances of the data network identifier to multiple client devices 118 via a data network 115, such as the Internet.

The process 400 also involves determining whether sufficient data exists in the data source for the category of information based on receiving electronic communications that are responsive to the instances of the first version of the electronic form to which access has been provided, as depicted in block 430. For example, the electronic data processing application 104 can be executed by a suitable processing device to determine whether sufficient data exists in the data source for the data category 110. The electronic data processing application 104 can make the determination subsequent to providing access to the instances of the first version of the electronic form 106. In some embodiments, the electronic data processing application 104 can make the determination in response to determining that a threshold number of responsive electronic communications has been received. For example, a threshold number for the responsive electronic communications can be determined or otherwise identified based on data received by the electronic data processing application 104 using an interface 302 or other suitable interface provided to a vendor system 116.

The process 400 also involves providing access to multiple instances of a second version of the electronic form that omits or replaces at least some content present in the first version of the electronic form for soliciting data associated with the category of information, as depicted in block 440. In some aspects, access can be provided to at least some of the same clients that accessed the first version of the electronic form. In additional or alternative aspects, access can be provided to at least some clients that are different from the clients that accessed the first version of the electronic form. The access to the second version of the electronic form can be provided based on determining whether sufficient data exists for the category of information. For example, the electronic data processing application 104 can be executed by a suitable processing device to provide access to the second version of the electronic form in a manner similar to that described above with respect to block 420.

The electronic data processing application 104 can provide access to any additional version of the electronic form 106 that omits at least some content present in the first version. FIGS. 5-8 depict examples of different adaptive modifications of electronic content. In some embodiments, a second version of the electronic form 106 that omits at least some content present in the first version can have a smaller size when presented at a client device as compared to the first version. In additional or alternative embodiments, a second version of the electronic form 106 that omits at least some content present in the first version can replace the omitted content with alternative content. In one non-limiting example, replacing the omitted content with alternative content can involve replacing one or more content items that correspond to a given category of information with one or more content items that correspond to a different category of information and/or a more specific sub-category of information. In another non-limiting example, replacing the omitted content with alternative content can involve replacing one or more content items for soliciting non-standardized data (e.g., one or more fields soliciting narrative content related to a category) with one or more content items for soliciting standardized data (e.g., one or more fields soliciting "yes" or "no" answers to questions related to the same category). In another non-limiting example, replacing the omitted content with alternative content can involve replacing one or more content items that more generally solicit information (e.g., "How was your shopping experience?" followed by a narrative field) with one or more content items that more specifically solicit the same information (e.g., "How was your shopping experience?" followed by suggestions for completing a narrative field).

Figure 5:
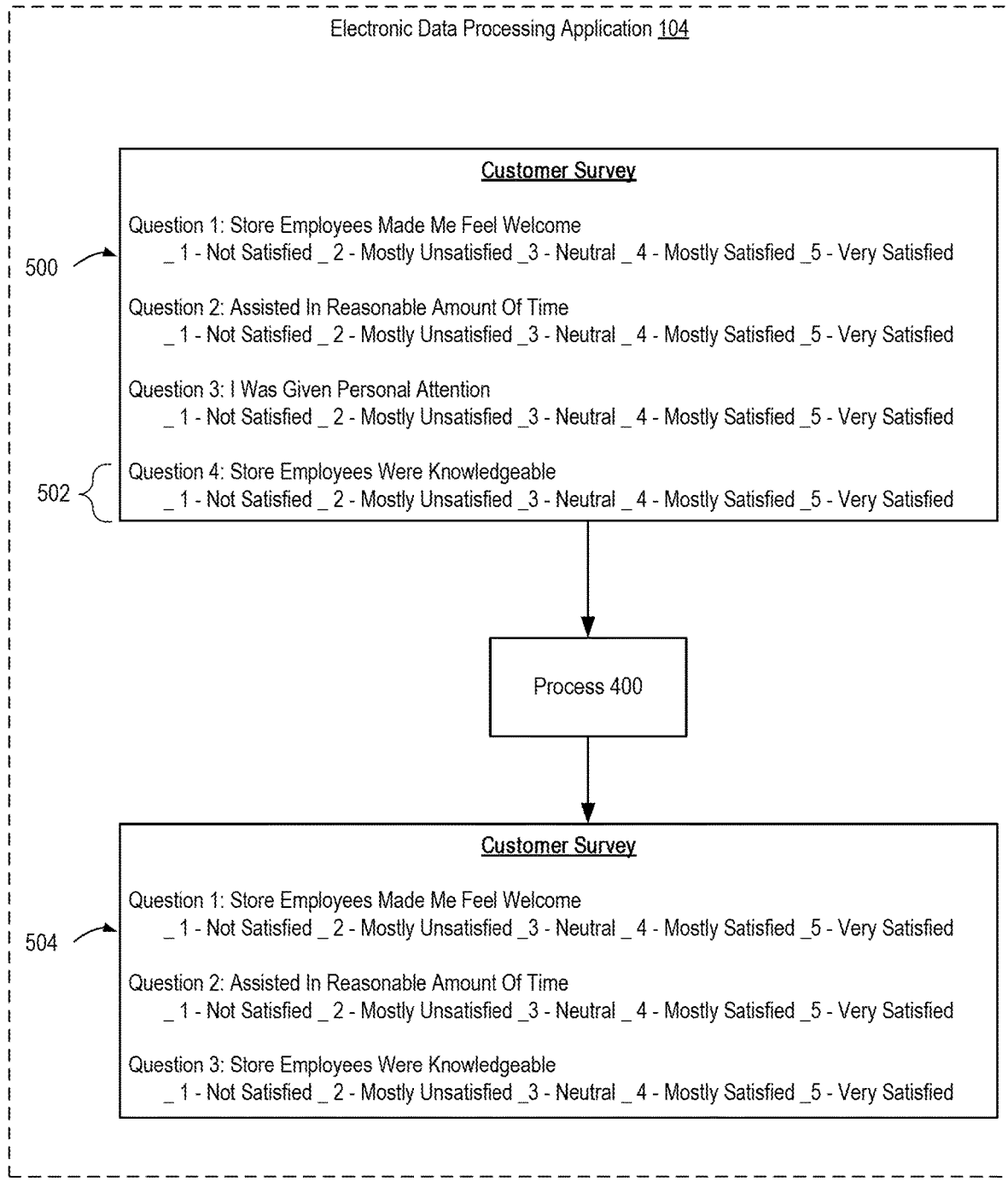
FIG. 5 is a diagram depicting an example of reducing form size by using an alternative version of an electronic form in which specified content is omitted based on executing a process for intelligently adapting form content according to certain exemplary embodiments.

FIG. 5 is a diagram depicting an example of reducing a form size by using an alternative version of an electronic form 106 in which specified content is omitted based on executing the process 400 for intelligently adapting form content. A first version 500 of an electronic form 106 can include content 502. The content 502 depicted in FIG. 5 includes the text of a question regarding the knowledge of store employees and a set of fields that are configured for receiving data indicative of the knowledge of store employees (e.g., radio buttons in which only one of the five possible answers can be selected). A second version 504 of the electronic form 106 can omit the content 502. Omitting the content 502 can allow the second version 504 to be reduced in size as compared to the first version 500.

In some embodiments, the electronic data processing application 104 can alternately provide access to instances of version 500 and instances of version 504 during a given time period based on determining that sufficient data exists for a category 110 associated with the content 502 (e.g., a consensus has been reached). For example, the electronic data processing application 104 can determine that a consensus exists with respect to a category 110 associated with the content 502 after receiving a threshold number of responsive electronic communications in response to providing access to the version 500 of the electronic form 106. The electronic data processing application 104 can determine that if a consensus exists, the content 502 should be presented in 25% of the subsequent presentations of the electronic form 106. In 25% of the subsequent presentations, the electronic data processing application 104 can transmit or otherwise provide access to the version 500 of the electronic form 106. In 75% of the subsequent presentations, the electronic data processing application 104 can transmit or otherwise provide access to the version 504 of the electronic form 106 in which content 502 is omitted and the size of the electronic form 106 is reduced.

In additional or alternative embodiments, the frequency with which the electronic data processing application 104 provides access to the version 504 can be determined based on an amount of data used to determine a consensus for a category 110. For example, a first amount of data can be used to determine a consensus for a category 110 with a first degree of reliability and a second amount of data can be used to determine a consensus for a category 110 with a second degree of reliability that is higher than the first degree of reliability. The electronic data processing application 104 can use a first frequency at which client devices 118 are provided access to the version 504 based on determining that the consensus has been determined with the first degree of reliability. The electronic data processing application 104 can use a second frequency at which client devices 118 are provided access to the version 504 based on determining that the consensus has been determined with the second degree of reliability. The second frequency can be greater than the first frequency.

In some embodiments, the amount of valid data that is available for determining the consensus can vary based on time. For example, the electronic data processing application 104 may only use data received during a preceding time period of a given length, such as one week, to determine a consensus for a category 110. At the first point in time, a sufficient amount of data may have been received during the preceding time period to determine a consensus with a first degree of reliability. The electronic data processing application 104 can use a first frequency corresponding to the first degree of reliability for presenting the version 504 following the first point in time. At the second point in time, a sufficient amount of data may have been received during the preceding time period to determine the consensus with a second degree of reliability. The electronic data processing application 104 can use a second frequency corresponding to the second degree of reliability for presenting the version 504 following the second point in time.

In additional or alternative embodiments, the electronic data processing application 104 can provide access to instances of version 504 during a given time period based on determining that sufficient data exists for a category 110 associated with the content 502 and further based on determining that a client device 118 to which access will be provided has a display screen that is less than a threshold size. In some embodiments, the electronic data processing application 104 can determine that a client device 118 has a display screen that is less than a threshold size based on a device identifier received by the server system 102 from the client device 118 via a data network 115. For example, the electronic data processing application 104 can receive data indicating that a given client device 118 is a mobile phone, a tablet, or another device type. The electronic data processing application 104 can access data from a non-transitory computer-readable medium identifying display screen sizes for different device types. The electronic data processing application 104 can identify a screen size for the client device 118 based on matching the device identifier received from the client device 118 to one of the device types listed in the accessed data. The electronic data processing application 104 can determine that a screen size for a display screen of the client device 118 is less than a threshold size. The electronic data processing application 104 can provide access to the version 504 of the form to the client device 118 based at least partially on determining that the screen size for the display screen of the client device 118 is less than the threshold size.

Figure 6:
FIG. 6 is a diagram depicting an example of providing alternative form content by using an alternative version of an electronic form in which one or more content items are replaced with one or more alternative content items based on executing a process for intelligently adapting form content according to certain exemplary embodiments.

FIG. 6 is a diagram depicting an example of providing alternative form content by using an alternative version of an electronic form 106 in which one or more content items are replaced with one or more alternative content items based on executing the process 400 for intelligently adapting form content. A first version 600 of an electronic form 106 can include content 602. The content 602 depicted in FIG. 6 includes the text of a question regarding the knowledge of store employees and a set of fields that are configured for receiving data indicative of the knowledge of store employees (e.g., radio buttons in which only one of the five possible answers can be selected). A second version 604 of the electronic form 106 can replace the content 602 with the content 604. The content 604 depicted in FIG. 6 includes the text of a more specific question regarding the knowledge of store employees with respect to a specified subject (e.g., a sales process) and a set of fields that are configured for receiving data indicative of the knowledge of store employees (e.g., radio buttons in which only one of the five possible answers can be selected).

Figure 7:
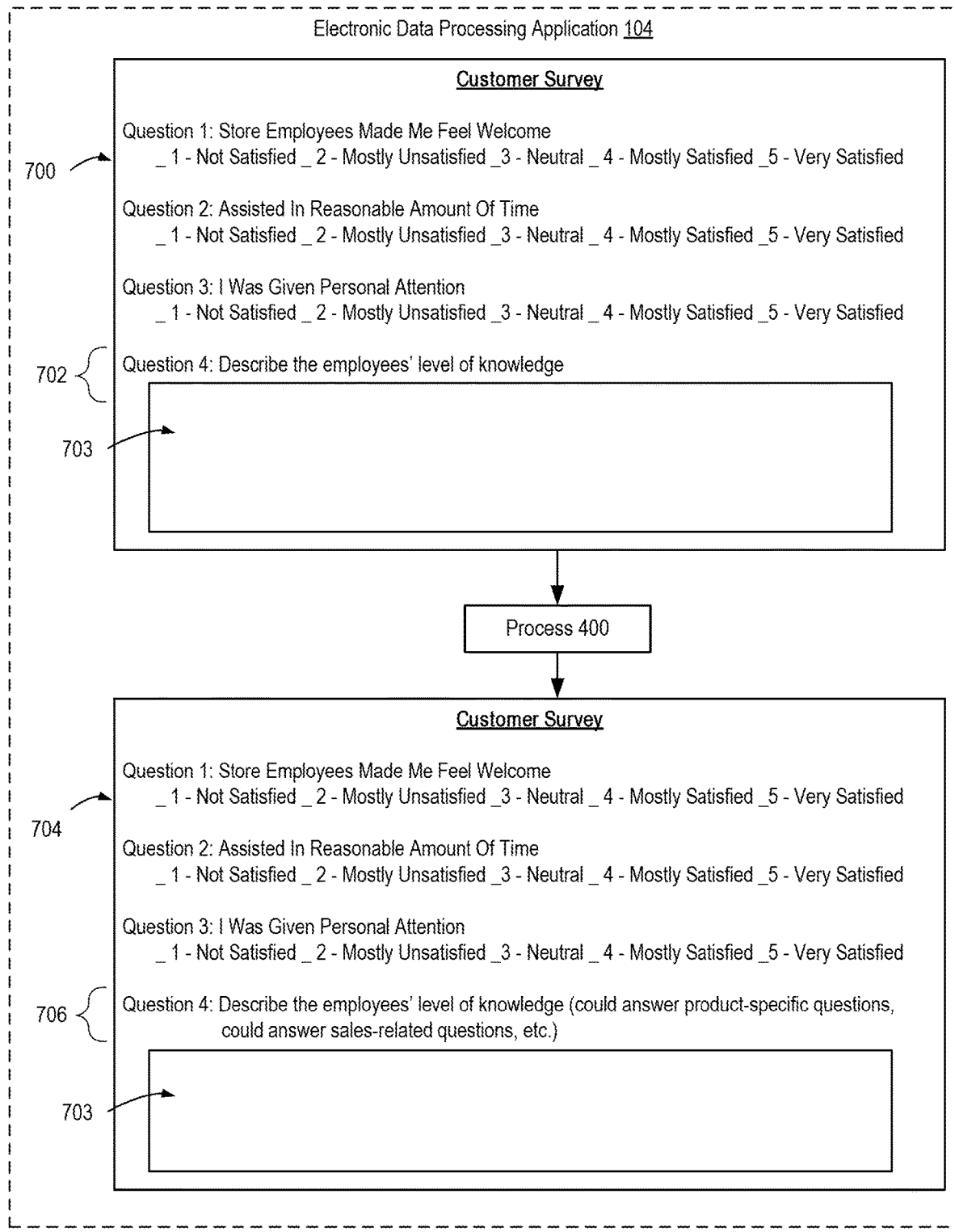
FIG. 7 is a diagram depicting an example of providing alternative form content for soliciting narrative feedback by using an alternative version of an electronic form in which one or more content items related to a narrative input field are replaced with one or more alternative content items that provide suggestions for data entry into the narrative input field according to certain exemplary embodiments.

FIG. 7 is a diagram depicting an example of providing alternative form content for soliciting narrative content by using an alternative version of an electronic form 106 in which one or more content items related to a narrative input field are replaced with one or more alternative content items that provide suggestions for data entry into the narrative input field. One example of a suggestion for a text field or other narrative field is a suggestion included in a caption that is displayed adjacent to the text field or other narrative field. Another example of a suggestion for a text field or other narrative field is a suggestion that is displayed in a pop-up box or is otherwise presented with the text field or other narrative field.

A first version 700 of an electronic form 106 can include content 702. The content 702 depicted in FIG. 7 includes the text of a question regarding the knowledge of store employees. The content 702 can be associated with a text input field 703 configured for receiving narrative content regarding a data category 110. A second version 704 of the electronic form 106 can replace the content 702 with the content 704. The content 704 depicted in FIG. 7 includes the text of the question regarding the knowledge of store employees along with suggestions for topics to address when entering the narrative content into the text input field 703.

In some embodiments, for data categories 110 in which an electronic form 106 includes one or more content items configured for receiving narrative content or other non-standardized data, the electronic data processing application 104 can execute one or more algorithms for performing a keyword analysis. In some embodiments, the keyword analysis can be used to obtain data for determining whether a consensus has been reached for a given question or for otherwise determining whether sufficient data has been obtained for a given data category 110. In additional or alternative embodiments, the keyword analysis can be used to obtain or generate supplemental content (e.g., suggestions) that may be presented in an alternative version of an electronic form 106 for obtaining narrative content or other non-standardized data. In additional or alternative embodiments, the keyword analysis can be used to generate, select, or otherwise obtain an alternative version of an electronic form 106 that includes content for obtaining standardized data that relates to the same data category as the narrative content or other non-standardized data.

The electronic data processing application 104 can execute a text analysis or other content analysis algorithm, such as a natural language processing algorithm. The text analysis or other content analysis algorithm can output one or more keywords obtained from the narrative content entered into a field of the electronic form 106. A keyword can represent one or more important words in the narrative content. In some embodiments, the text analysis or other content analysis algorithm may identify common nouns and proper nouns as important words. For example, narrative content may include the following string: "The staff was ready to help, but I had to push my way through the crowds to grab anything at the store; I will not go there anymore." The electronic data processing application 104 can execute a text analysis or other content analysis algorithm to obtain keywords such as "store," "crowd," "staff," "ready" from the string.

In additional or alternative embodiments, the electronic data processing application 104 can execute one or more algorithms for determining a sentiment associated with one or more keywords obtained from a keyword analysis. An algorithm for determining a sentiment can obtain a sentiment associated with one or more keywords in given context. For example, executing a text analysis or other content analysis algorithm can obtain keywords such as "store," "crowd," "staff," and "ready." Executing an algorithm for determining a sentiment can generate an output indicating that a sentiment for the keyword "crowd" is negative and an output indicating that a sentiment for the keyword "staff" is positive.

The electronic data processing application 104 can determine frequencies associated with which different keywords are used in a set of responsive electronic communications received in response to providing access to an electronic form 106 during a given time period. For example, a set of 100 responsive electronic communications may include 50 electronic communications that mention the keyword "staff" and 35 electronic communications that mention the keyword "crowd." The electronic data processing application 104 can also determine an average sentiment associated with one or more keywords that have frequencies above a threshold frequency.

The electronic data processing application 104 can generate suggestions, hints, or other supplemental content to be presented in an alternative version of a form having a field configured for receiving narrative content or other non-standardized data. In some embodiments, the supplemental content can be generated using one or more keywords obtained from the keyword analysis. For example, textual content accompanying a narrative field, such as "Tell us about your experience," can be modified to include hints or suggestions from the obtained keywords, such as "Tell us about your experience with respect to staffing, crowds, etc." In additional or alternative embodiments, the supplemental content can be generated using one or more keywords obtained from the keyword analysis and one or more sentiments obtained from the text analysis or other content analysis. For example, if a negative sentiment is associated with the keyword "crowd," textual content accompanying a narrative field, such as "Tell us about your experience," can be modified to include hints or suggestions from the obtained keywords having the negative sentiment, such as "Tell us about your experience (e.g., levels of crowding, etc.)."

In some embodiments, a version of an electronic form 106 that solicits standardized data can be generated from a keyword analysis or other analysis of responses to a different version of the electronic form 106 that solicits standardized data. For example, instead of (or in addition to) generating an alternative version of an electronic form 106 that uses keywords to generate hints or suggestions for a narrative field (e.g., "Tell us about your experience with respect to levels of crowding, staffing, etc."), the electronic data processing application 104 can generate an alternative version of an electronic form 106 that uses keywords to generate one or more questions that accompany fields configured for receiving standardized data (e.g., "Rate your experience with respect to levels of crowding on a scale of 1-10," "Rate your experience with respect to levels of staffing on a scale of 1-10," etc.).

Figure 8:
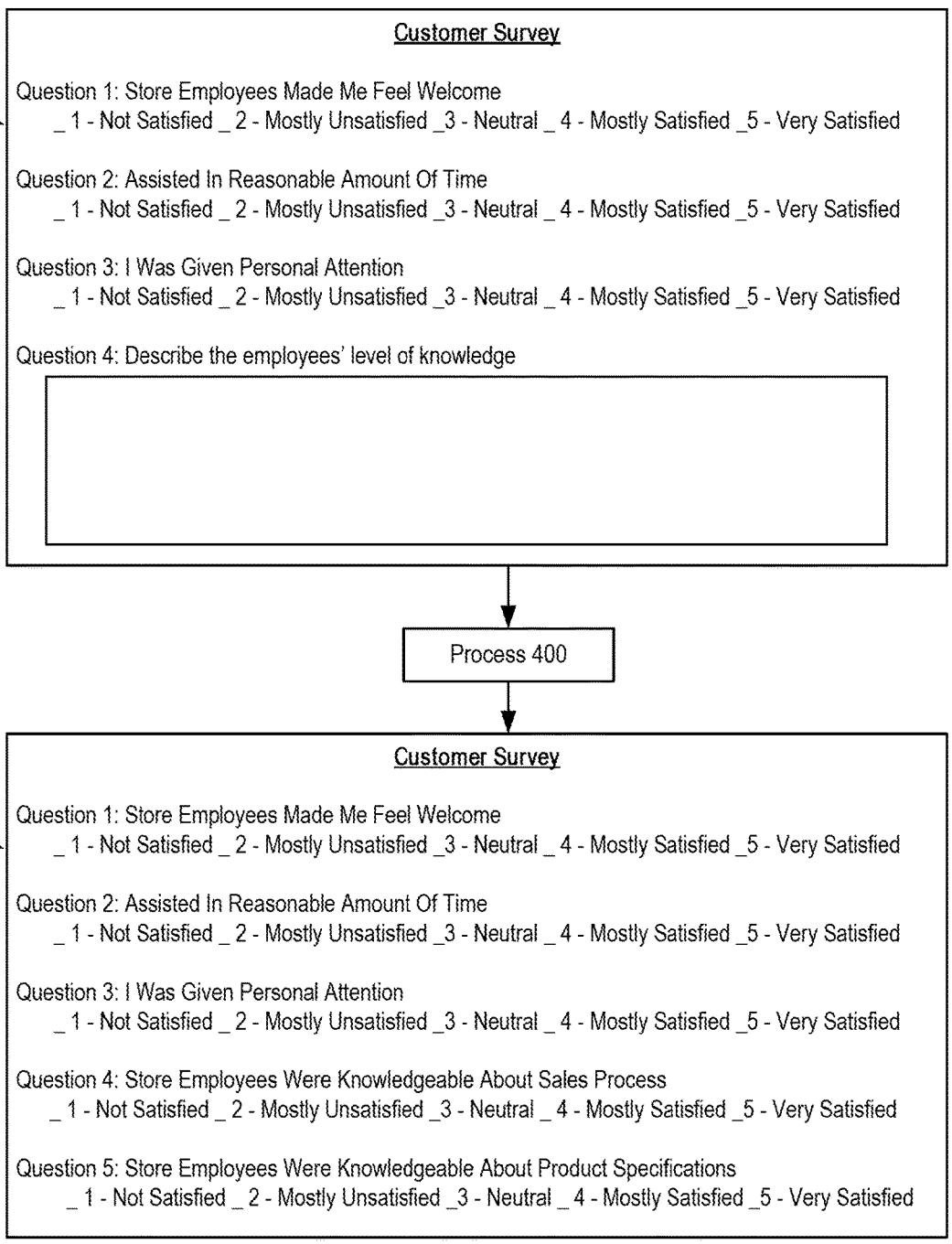
FIG. 8 is a diagram depicting an example of providing alternative form content for soliciting narrative feedback by using an alternative version of an electronic form in which a narrative input field is replaced with fields for receiving standardized data according to certain exemplary embodiments.

For example, FIG. 8 is a diagram depicting an example of providing form content for soliciting alternatives to narrative content by using an alternative version of an electronic form 106 in which a narrative input field is replaced with fields restricted to entering standardized data. A first version 800 of an electronic form 106 can include content 802. The content 802 depicted in FIG. 8 includes the text of a question regarding the knowledge of store employees (i.e., a data category 110) and a text input field 803 configured for receiving narrative content regarding the data category 110. A second version 804 of the electronic form 106 can replace the content 802 with the content 806. The content 806 depicted in FIG. 8 includes the text of the questions regarding the knowledge of store employees and a set of fields that are configured for receiving standardized data indicative of the knowledge of store employees (e.g., radio buttons in which only one of the five possible answers can be selected).

In some embodiments, different versions of an electronic form 106 can be presented based on whether responsive electronic communications include narrative content or other non-standardized data solicited by the electronic form 106. In some embodiments, if a responsive electronic communication from a first client does not include a threshold amount of data in a field configured for receiving narrative content or other non-standardized data, a subsequent presentation of an electronic form 106 to a second client can use an alternative version of the electronic form 106 having one or more fields configured for receiving standardized data. For example, if a first user skips a question in an electronic form 106 that solicits narrative content (e.g., "Tell us about your experience"), a second user may be presented with a version of the electronic form 106 that solicits similar information using one or more fields configured for receiving standardized data (e.g., "Rate the amount of crowding on a scale of 1-10," "Rate the amount of staffing on a scale of 1-10"). In additional or alternative embodiments, if a responsive electronic communication from a client does not include a threshold amount of data in a narrative content field or other non-standardized data field, an alternative version of the electronic form 106 soliciting standardized data may be presented to the same client. For example, if a user skips a question in an electronic form 106 that solicits narrative content (e.g., "Tell us about your experience"), the user may be presented with a version of the electronic form 106 that solicits similar information using one or more fields configured for receiving standardized data (e.g., "Rate the amount of crowding on a scale of 1-10," "Rate the amount of staffing on a scale of 1-10").

An example of a text analysis or other content analysis that can be performed by the electronic data processing application 104 is an n-gram part-of-speech ("POS") tagging algorithm. The n-gram POS tagging algorithm can include one or more operations for tokenizing narrative content or other non-standardized data received in response to a presentation of an electronic form 106. An example of a command for tokenizing narrative content or other non-standardized data is "tokens=nitk.word_tokenize(raw)." The n-gram POS tagging algorithm can also include one or more operations for converting tokenized text to lower case. An example of a command for converting tokenized text to lower case is "words=[w.lower( ) for w in tokens]." The n-gram POS tagging algorithm can also include one or more operations for finding stems of the tokenized words. An example of a command for finding stems of the tokenized words is "porter=nitk.PorterStemmer( ) lancaster=nitk.LancasterStemmer( ) stemedwords_first_pass=[porter.stem(t) for t in words]." An example of a command for finding stems of the tokenized words is "stemedwords_final_pass=[lancaster.stem(t) for t in stemedwords_first_pass]." The n-gram POS tagging algorithm can also include one or more operations for performing lemmatization of the tokenized words. An example of a command for performing lemmatization is "wnl=nitk.WordNetLemmatizer( ) completely_normalized_words=[wnl.lemmatize(t) for t in stemedwords_final_pass]." The n-gram POS tagging algorithm can also include one or more operations for tagging or otherwise identifying parts of speech for the tokenized words. An example of a command for tagging or otherwise identifying parts of speech for the tokenized words is "pos_tagged_words=nitk.pos_tag(completely_normalized_words)."

FIG. 9 is a diagram depicting an example of a script 900 for performing a natural language processing algorithm. An example of narrative content that can be analyzed using the script 900 is the string, "The staff was ready to help, but I had to push my way through the crowds to grab anything at the store. I will not go there anymore." The script 900 can be executed using this string to extract one instance of the keyword "crowd," one instance of the keyword "store," one instance of the keyword "staff," and one instance of the keyword "time."

In additional or alternative embodiments, the electronic data processing application 104 can execute one or more algorithms for detecting spam content prior to performing a text analysis or other content analysis. The electronic data processing application 104 can filter or otherwise omit content from responses that appear to be spam.

Figure 10:
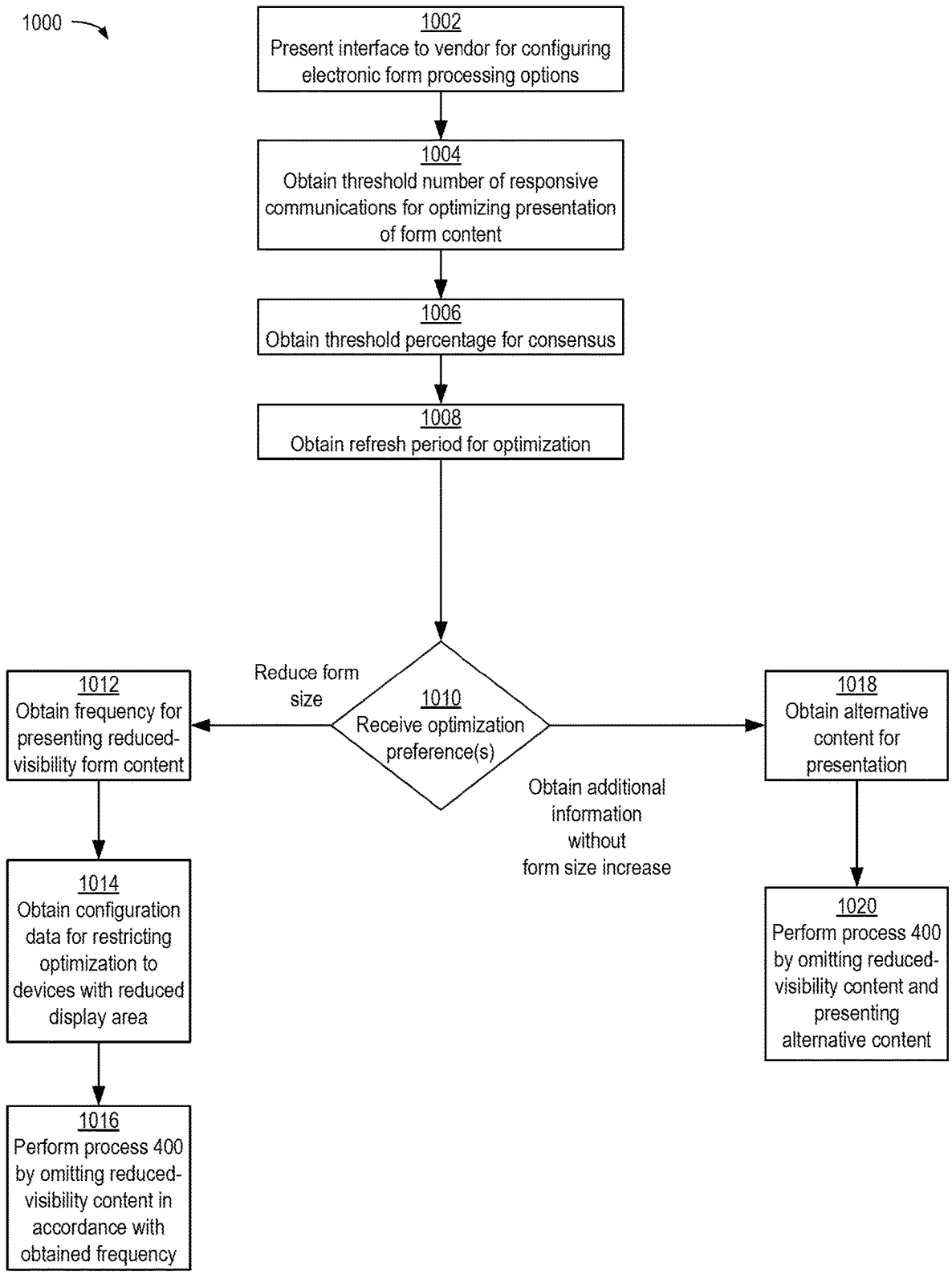
FIG. 10 is a flow chart depicting an example of a process for obtaining configuration data for use in intelligently adapting content presented in electronic forms according to certain exemplary embodiments.

FIG. 10 is a flow chart depicting an example of a process 100 for obtaining configuration data for use in intelligently adapting the content presented in electronic forms 106. For illustrative purposes, the method 400 is described with reference to the implementation depicted in FIG. 1. Other implementations, however, are possible.

The process 1000 involves presenting an interface to a vendor system for configuring electronic form processing options, as depicted in block 1002. For example, the electronic data processing application 104 can present or otherwise provide access to an interface to a vendor system 116 for configuring electronic form processing options by generating an interface 302 or other suitable interface. The interface 302 or other suitable interface can be transmitted or otherwise provided to a vendor system 116 via the Internet and/or another suitable data network 115. The interface 302 or other suitable interface can be displayed or otherwise presented at the vendor system 116 by a vendor form application 112.

The process 1000 also involves obtaining, via the interface, a threshold number of responsive communications for optimizing presentation of form content, as depicted in block 1004. For example, the electronic data processing application 104 can receive data entered into the interface 302 or another suitable interface from the vendor system 116 via one or more suitable data networks 115. The data can specify or otherwise indicate that a process 400 or other suitable algorithm for optimizing the presentation of content in electronic forms is to be executed after a threshold number of responsive communications have been received in response to one or more versions of an electronic form 106 being presented to client devices 118.

The process 1000 also involves obtaining threshold percentages or other values that can be used for determining a consensus with respect to a data category 110, as depicted in block 1006. For example, the electronic data processing application 104 can receive data entered into the interface 302 or another suitable interface from the vendor system 116 via one or more suitable data networks 115. The data can specify or otherwise indicate that if a threshold number of responsive communications includes one or more values, ranges of values, or other specified content, the responsive communications can be used to determine a consensus for a category 110 of information.

The process 1000 also involves obtaining a refresh period for optimizing content to be presented via one or more electronic forms, as depicted in block 1008. For example, the electronic data processing application 104 can receive data entered into the interface 302 or another suitable interface from the vendor system 116 via one or more suitable data networks 115. The data can specify or otherwise indicate that if responsive communications received outside of a specified window of time (e.g., the last seven days) is to be disregarded for purposes of performing the process 400 or other suitable algorithm for optimizing the presentation of content in electronic forms.

The process 1000 also involves receiving one or more optimization preferences, as depicted in block 1010. For example, the electronic data processing application 104 can receive data entered into the interface 302 or another suitable interface from the vendor system 116 via one or more suitable data networks 115. The data can specify or otherwise indicate preferences for optimizing form content. For example, the data can indicate whether optimizing content in the presentation of a form involves reducing a size of the form. The data can also indicate whether optimizing content in the presentation of a form involves obtaining additional information via the form without reducing a size of the form.

If data received via the interface indicates that optimizing content in the presentation of a form involves reducing a size of the form, the process 100 also involves obtaining a frequency for presenting reduced-visibility content, as depicted in block 1012. For example, the electronic data processing application 104 can receive data entered into the interface 302 or another suitable interface from the vendor system 116 via one or more suitable data networks 115. The data can specify or otherwise indicate preferences for how frequently certain content in the form is to be displayed. Examples of displaying form content with different frequencies are described above with respect to FIG. 5. The process 1000 also involves obtaining configuration data for restricting optimization to devices with a reduced display area, as depicted in block 1014. For example, the electronic data processing application 104 can receive data entered into the interface 302 or another suitable interface from the vendor system 116 via one or more suitable data networks 115. The data can specify or otherwise indicate whether one or more operations of a process 400 are to be performed based on a client device 118 having a screen size below a given threshold size. The process 1000 also involves performing the process 400 or other suitable algorithm for optimizing the presentation of content in electronic forms by omitting reduced-visibility content in accordance with the obtained frequency, as depicted in block 1016. For example, the electronic data processing application 104 can execute the process 400 as described above with respect to FIG. 4. The electronic data processing application 104 can perform one or more operations for omitting reduced-visibility content (e.g., certain questions in a form) using the obtained frequency setting. For example, the electronic data processing application 104 can omit reduced-visibility content in the manner described above with respect to FIG. 5.

If data received via the interface indicates that optimizing content in the presentation of a form involves obtaining additional information via the form without reducing a size of the form, the process 100 also involves obtaining alternate content for presentation in a form, as depicted in block 1018. For example, the electronic data processing application 104 can receive data entered into the interface 302 or another suitable interface from the vendor system 116 via one or more suitable data networks 115. The data can specify or otherwise indicate alternate questions, fields, or other form content to be displayed using alternative versions of a form. The process 1000 also involves performing the process 400 or other suitable algorithm for optimizing the presentation of content in electronic forms by omitting reduced-visibility content and presenting alternative content, as depicted in block 1020. For example, the electronic data processing application 104 can present alternative content in the manner described above with respect to FIGS. 6-9.

Figure 11:
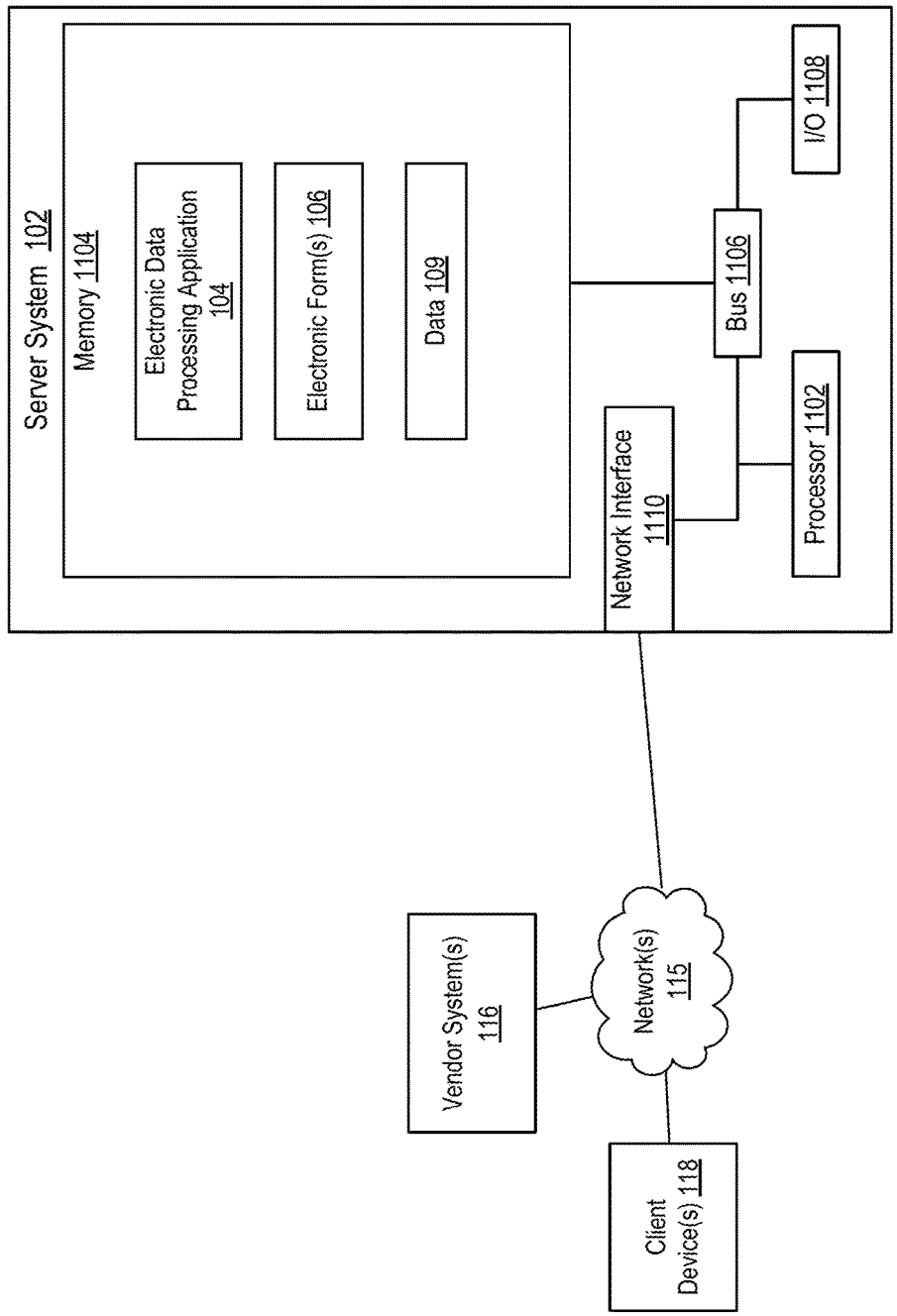
FIG. 11 is a block diagram depicting an example of a server system that executes the electronic data processing application for adaptively presenting content from electronic forms according to certain exemplary embodiments.

Any suitable computing system or group of computing systems can be used to implement the server system 102. FIG. 11 is a block diagram depicting an example of a server system 102 that executes the electronic data processing application 104 for adaptively presenting content from electronic forms 106.

The server system 102 can include a processor 1102 that is communicatively coupled to a memory 1104 and that executes computer-executable program code and/or accesses information stored in the memory 1104. The processor 1102 may comprise a microprocessor, an application-specific integrated circuit ("ASIC"), a state machine, or other processing device. The processor 1102 can include any of a number of processing devices, including one. Such a processor can include or may be in communication with a computer-readable medium storing instructions that, when executed by the processor 1102, cause the processor to perform the operations described herein.

The memory 1104 can include any suitable computer-readable medium. The computer-readable medium can include any electronic, optical, magnetic, or other storage device capable of providing a processor with computer-readable instructions or other program code. Non-limiting examples of a computer-readable medium include a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The server system 102 may also comprise a number of external or internal devices such as input or output devices. For example, the server system 102 is shown with an input/output ("I/O") interface 1108 that can receive input from input devices or provide output to output devices. A bus 1106 can also be included in the server system 102. The bus 1106 can communicatively couple one or more components of the server system 102.

The server system 102 can execute program code that configures the processor 1102 to perform one or more of the operations described above with respect to FIGS. 1-10. The program code can include, for example, the electronic data processing application 104. The program code may be resident in the memory 1104 or any suitable computer-readable medium and may be executed by the processor 1102 or any other suitable processor. In some embodiments, the electronic forms 106 and data 109 can be resident in the memory 1104, as depicted in FIG. 11. In other embodiments, one or more of the electronic forms 106 and data 109 can be resident in a memory that is accessible via a data network, such as a memory accessible to a cloud service.

The server system 102 can also include at least one network interface 1110. The network interface 1110 can include any device or group of devices suitable for establishing a wired or wireless data connection to one or more data networks 912. Non-limiting examples of the network interface 1110 include an Ethernet network adapter, a modem, and/or the like. The server system 102 can communicate with one or more vendor systems 116 and/or one of more client devices 118 using the network interface 1110.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A method for adaptively modifying interactive content provided to client devices over data networks, wherein the method includes one or more processing devices performing operations comprising:
   transmitting, via a data network and to client devices, messages that provide electronic access to a first version of an electronic form, wherein the first version of the electronic form includes a field configured for receiving input from the client devices;
   determining, from responsive client communications received from the client devices, that sufficient data exists for a data category associated with the field from the first version of the electronic form;
   generating a second version of the electronic form with a smaller amount of form content than the first version, wherein the second version omits the field associated with the data category having sufficient data;
   computing, as a function of an amount of data that exists for the data category, a frequency for transmitting the second version of the electronic form instead of the first version;
   transmitting, to additional client devices, additional messages that provide electronic access to the first version of the electronic form or the second version of the electronic form,
   wherein a percentage of the additional messages that provide electronic access to the second version of the electronic form corresponds to the frequency.

2. The method of claim 1, the operations further comprising:
   obtaining, via the data network, a device identifier for a target client device;
   matching the device identifier to a device type;
   identifying a device type screen size for the device type to which the device identifier is matched; and
   determining that the device type screen size is less than a threshold screen size,
   wherein transmitting the additional messages that provide electronic access to the first version of the electronic form or the second version of the electronic form comprises transmitting, to the target client device, an additional message that provides access to the second version of the electronic form, based on the device type screen size being less than the threshold screen size.

3. The method of claim 1, the operations further comprising, prior to transmitting the additional messages:
   establishing a data connection to a vendor computing system that is separate from the one or more processing devices and from the client devices;
   obtaining, via the data connection, the electronic form from the vendor computing system;
   providing, to the vendor computing system and via the data connection, a configuration interface for controlling an adaptive modification of interactive form content; and
   receiving, via the configuration interface, an optimization preference specifying that the second version of the electronic form should have the smaller amount of form content rather than a same amount of form content that replaces the field with an additional field;
   wherein the second version of the electronic form with the smaller amount of form content is generated based on the optimization preference being received from the vendor computing system.

4. The method of claim 1, the operations further comprising:
   determining that a target client device has a screen size that is less than a threshold screen size,
   wherein transmitting the additional messages that provide electronic access to the first version of the electronic form or the second version of the electronic form comprises transmitting, to the target client device, an additional message that provides access to the second version of the electronic form, based on the screen size being less than the threshold screen size.

5. The method of claim 1, wherein the function of the amount of data is computed based on a threshold amount of data required for obtaining a consensus with respect to the data category.

6. The method of claim 5, wherein computing the frequency is based on the amount of data for the data category corresponding to a first time period and exceeding the threshold amount of data by a first amount, wherein the operations further comprise:
   computing, subsequent to computing the frequency, an additional frequency for (i) third additional client devices to which the first version is to be transmitted and (ii) fourth additional client devices to which the second version is to be transmitted, wherein the additional frequency is computed based on an updated amount of data for the data category that (i) corresponds to a second time period and (ii) exceeds the threshold amount by a second amount;

transmitting, to the third additional client devices, third additional messages that provide electronic access to the first version of the electronic form; and transmitting, to the fourth additional client devices, fourth additional messages that provide electronic access to the second version of the electronic form, wherein the third additional messages and the fourth additional messages are transmitted according to the additional frequency.

7. The method of claim 1, the operations further comprising:

determining that a screen size of a target client device is less than a threshold screen size, wherein generating the second version of the electronic form with the smaller amount of form content than the first version is based on the screen size of the target client device being less than the threshold screen size, and wherein transmitting the additional messages that provide electronic access to the first version of the electronic form or the second version of the electronic form comprises transmitting, to the target client device, an additional message that provides access to the second version of the electronic form, based on the screen size of the target client device being less than the threshold screen size.

8. A computing system comprising:

one or more processing devices;

a non-transitory computer-readable medium communicatively coupled to the one or more processing devices; and one or more network interface devices communicatively coupled to the one or more processing devices and configured for communicating, via a data network, with client devices, wherein the one or more processing devices are configured to execute instructions stored in the non-transitory computer-readable medium and thereby perform operations comprising:

configuring the one or more network interface devices to transmit, to the client devices, messages that provide electronic access to a first version of an electronic form, wherein the first version of the electronic form includes a field configured for receiving input from the client devices, determining, from responsive client communications received from the client devices via the one or more network interface devices, that sufficient data exists for a data category associated with the field from the first version of the electronic form, generating a second version of the electronic form with a smaller amount of form content than the first version, wherein the second version omits the field associated with the data category having sufficient data, computing, as a function of an amount of data that exists for the data category, a frequency for transmitting the second version of the electronic form instead of the first version;

transmitting, to additional client devices, additional messages that provide electronic access to the first version of the electronic form or the second version of the electronic form, wherein a percentage of the additional messages that provide electronic access to the second version of the electronic form corresponds to the frequency.

9. The computing system of claim 8, the operations further comprising:

obtaining, via the data network, a device identifier for a target client device;

matching the device identifier to a device type;

identifying a device type screen size for the device type to which the device identifier is matched; and determining that the device type screen size is less than a threshold screen size, wherein transmitting the additional messages that provide electronic access to the first version of the electronic form or the second version of the electronic form comprises transmitting, to the target client device, an additional message that provides access to the second version of the electronic form, based on the device type screen size being less than the threshold screen size.

10. The computing system of claim 8, the operations further comprising, prior to transmitting the additional messages:

establishing, with the one or more network interface devices, a data connection to a vendor computing system that is separate from the client devices;

obtaining, via the data connection, the electronic form from the vendor computing system;

providing, to the vendor computing system and via the data connection, a configuration interface for controlling an adaptive modification of interactive form content; and receiving, via the configuration interface, an optimization preference specifying that the second version of the electronic form should have the smaller amount of form content rather than a same amount of form content that replaces the field with an additional field;

wherein the second version of the electronic form with the smaller amount of form content is generated based on the optimization preference being received from the vendor computing system.

11. The computing system of claim 8, the operations further comprising:

determining that a target client device has a screen size that is less than a threshold screen size, wherein transmitting the additional messages that provide electronic access to the first version of the electronic form or the second version of the electronic form comprises transmitting, to the target client device, an additional message that provides access to the second version of the electronic form, based on the screen size being less than the threshold screen size.

12. The computing system of claim 8, wherein the function of the amount of data is computed based on a threshold amount of data required for obtaining a consensus with respect to the data category.

13. The computing system of claim 12, wherein computing the frequency is based on the amount of data for the data category corresponding to a first time period and exceeding the threshold amount of data by a first amount, wherein the operations further comprise:

computing, subsequent to computing the frequency, an additional frequency for (i) third additional client devices to which the first version is to be transmitted and (ii) fourth additional client devices to which the second version is to be transmitted, wherein the additional frequency is computed based on an updated amount of data for the data category that (i) corresponds to a second time period and (ii) exceeds the threshold amount by a second amount;

transmitting, to the third additional client devices, third additional messages that provide electronic access to the first version of the electronic form; and transmitting, to the fourth additional client devices, fourth additional messages that provide electronic access to the second version of the electronic form, wherein the third additional messages and the fourth additional messages are transmitted according to the additional frequency.

14. The computing system of claim 8, the operations further comprising:

determining that a screen size of a target client device is less than a threshold screen size, wherein generating the second version of the electronic form with the smaller amount of form content than the first version is based on the screen size of the target client device being less than the threshold screen size, and wherein transmitting the additional messages that provide electronic access to the first version of the electronic form or the second version of the electronic form comprises transmitting, to the target client device, an additional message that provides access to the second version of the electronic form, based on the screen size of the target client device being less than the threshold screen size.

15. A non-transitory computer-readable medium have executable program code stored thereon, wherein the executable program code, when executed by one or more processing devices, configures the one or more processing devices to perform operations comprising:

transmitting, via a data network and to client devices, messages that provide electronic access to a first version of an electronic form, wherein the first version of the electronic form includes a field configured for receiving input from the client devices;

determining, from responsive client communications received from the client devices, that sufficient data exists for a data category associated with the field from the first version of the electronic form;

generating a second version of the electronic form with a smaller amount of form content than the first version, wherein the second version omits the field associated with the data category having sufficient data;

computing, as a function of an amount of data that exists for the data category, a frequency for transmitting the second version of the electronic form instead of the first version;

transmitting, to additional client devices, additional messages that provide electronic access to the first version of the electronic form or the second version of the electronic form, wherein a percentage of the additional messages that provide electronic access to the second version of the electronic form corresponds to the frequency.

16. The non-transitory computer-readable medium of claim 15, the operations further comprising:

obtaining, via the data network, a device identifier for a target client device;

matching the device identifier to a device type of the target client device;

identifying a device type screen size for the device type to which the device identifier is matched; and determining that the device type screen size is less than a threshold screen size; and prior to transmitting the additional messages:

establishing a data connection to a vendor computing system that is separate from the one or more processing devices and from the client devices;

obtaining, via the data connection, the electronic form from the vendor computing system;

providing, to the vendor computing system and via the data connection, a configuration interface for controlling an adaptive modification of interactive form content; and receiving, via the configuration interface, an optimization preference specifying that the second version of the electronic form should have the smaller amount of form content rather than a same amount of form content that replaces the field with an additional field;

wherein the device type screen size of the device type of the target client device is determined and the second version of the electronic form with the smaller amount of form content is generated based on the optimization preference being received from the vendor computing system.

17. The non-transitory computer-readable medium of claim 15, the operations further comprising:

determining that a target client device has a screen size that is less than a threshold screen size, wherein transmitting the additional messages that provide electronic access to the first version of the electronic form or the second version of the electronic form comprises transmitting, to the target client device, an additional message that provides access to the second version of the electronic form, based on the screen size being less than the threshold screen size.

18. The non-transitory computer-readable medium of claim 15, wherein the function of the amount of data is computed based on a threshold amount of data required for obtaining a consensus with respect to the data category.

19. The non-transitory computer-readable medium of claim 18, wherein computing the frequency is based on the amount of data for the data category corresponding to a first time period and exceeding the threshold amount of data by a first amount, wherein the operations further comprise:

computing, subsequent to computing the frequency, an additional frequency for (i) third additional client devices to which the first version is to be transmitted and (ii) fourth additional client devices to which the second version is to be transmitted, wherein the additional frequency is computed based on an updated amount of data for the data category that (i) corresponds to a second time period and (ii) exceeds the threshold amount by a second amount;

transmitting, to the third additional client devices, third additional messages that provide electronic access to the first version of the electronic form; and transmitting, to the fourth additional client devices, fourth additional messages that provide electronic access to the second version of the electronic form, wherein the third additional messages and the fourth additional messages are transmitted according to the additional frequency.

20. The non-transitory computer-readable medium of claim 15, the operations further comprising:

determining that a screen size of a target client device is less than a threshold screen size, wherein generating the second version of the electronic form with the smaller amount of form content than the first version is based on the screen size of the target client device being less than the threshold screen size, and wherein transmitting the additional messages that provide electronic access to the first version of the electronic form or the second version of the electronic form comprises transmitting, to the target client device, an additional message that provides access to the second version of the electronic form, based on the screen size of the target client device being less than the threshold screen size.

* * * * *